United States Patent
Kamp

(10) Patent No.: US 9,258,369 B2
(45) Date of Patent: Feb. 9, 2016

(54) SYSTEM AND METHOD TO PROVIDE A NETWORK-BASED SERVICE

(75) Inventor: Rolf F. Kamp, Shrewsbury, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1144 days.

(21) Appl. No.: 12/487,577

(22) Filed: Jun. 18, 2009

(65) Prior Publication Data

US 2010/0325195 A1    Dec. 23, 2010

(51) Int. Cl.
*H04L 29/08*    (2006.01)

(52) U.S. Cl.
CPC ............ *H04L 67/16* (2013.01); *H04L 67/34* (2013.01)

(58) Field of Classification Search
CPC .... H04L 29/08702; H04L 67/16; H04L 67/34
USPC .............................................. 709/203; 726/8
See application file for complete search history.

(56) References Cited

U.S. PATENT DOCUMENTS

| | | |
|---|---|---|
| 2005/0251856 A1 | 11/2005 | Araujo et al. |
| 2006/0041637 A1 | 2/2006 | Jerrard-Dunne |
| 2008/0163337 A1* | 7/2008 | Tuliani et al. ............ 726/2 |
| 2008/0294781 A1* | 11/2008 | Hinton et al. .......... 709/227 |
| 2009/0083422 A1 | 3/2009 | McKay et al. |
| 2010/0050251 A1* | 2/2010 | Speyer et al. .......... 726/20 |

* cited by examiner

*Primary Examiner* — Jerry Dennison
(74) *Attorney, Agent, or Firm* — Akerman LLP; Michael K. Dixon; Mammen (Roy) P. Zachariah, Jr.

(57) ABSTRACT

A method of providing a network-based service can include receiving a request for a service at a proxy server, wherein the request identifies a user. The method can also include identifying an application associated with the service based on the request and identifying a user data element required by the application for the user to access the application. The method can also include creating an application request element that includes the identified data element and proxying the request to the application using the created application request element.

20 Claims, 4 Drawing Sheets

– 1 –
SYSTEM AND METHOD TO PROVIDE A NETWORK-BASED SERVICE

FIELD OF THE DISCLOSURE

The present disclosure generally relates to communications networks, and more particularly relates to systems and methods to provide a network-based service.

BACKGROUND

An enterprise can provide various services via a network portal. Online services, for example, can enable customers to engage in self-service activities that reduce support staff for the enterprise. As the enterprise offers services to an increasing population, the enterprise may offer applications to the general public that were classically offered to a more limited set of users.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed systems, methods and computer-readable media. Moreover, some statements may apply to some inventive features but not to others.

In the description below, a flow-charted technique may be described in a series of sequential actions. The sequence of the actions and the party performing the steps may be freely changed without departing from the scope of the teachings. Actions may be added, deleted, or altered in several ways. Similarly, the actions may be re-ordered or looped. Further, although processes, methods, algorithms or the like may be described in a sequential order, such processes, methods, algorithms, or any combination thereof may be operable to be performed in alternative orders. Further, some actions within a process, method, or algorithm may be performed simultaneously during at least a point in time (e.g., actions performed in parallel), can also be performed in whole, in part, or any combination thereof.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive- or and not to an exclusive- or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention.

Figure 1:
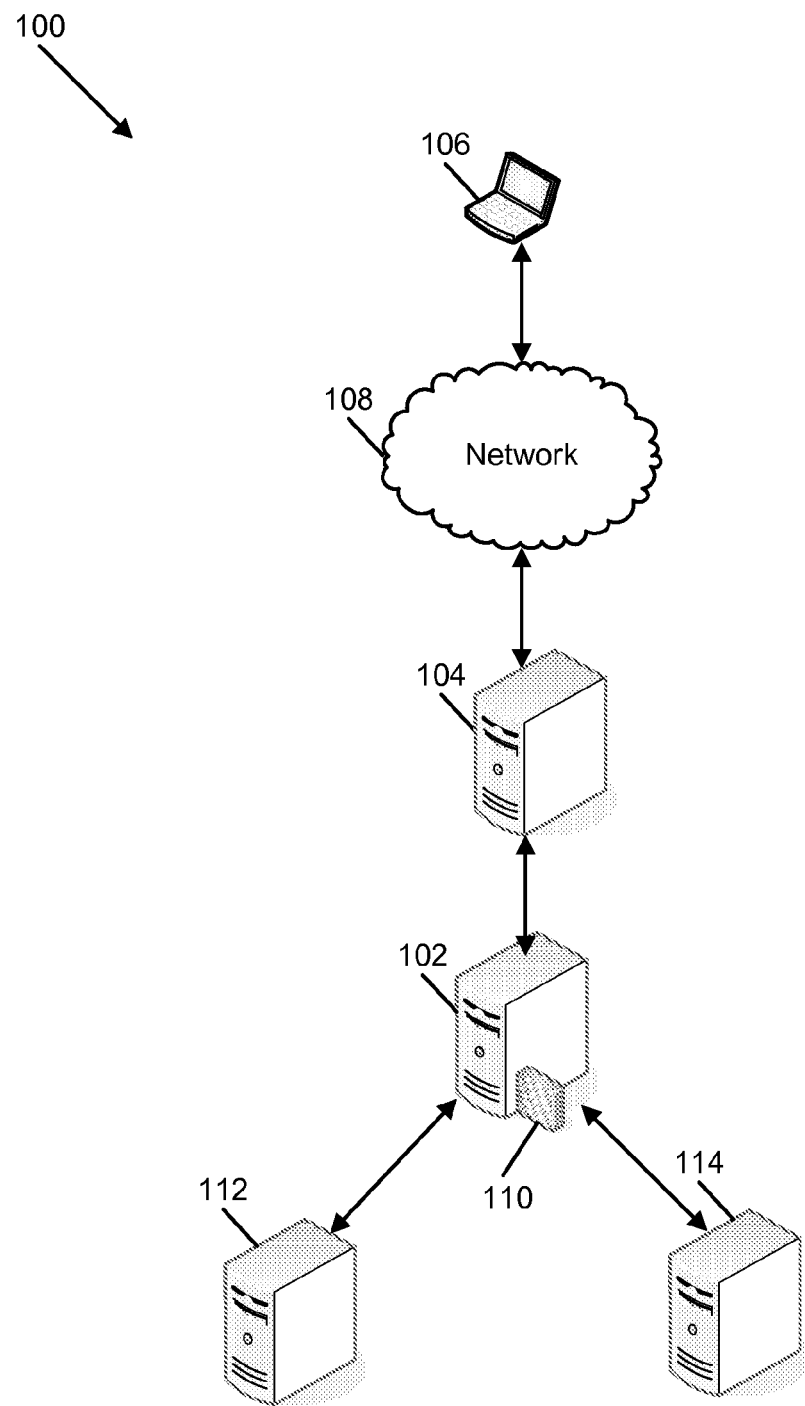
FIG. 1 is a block diagram illustrating a particular embodiment of a system to provide a network-based service.

FIG. 1 illustrates a particular embodiment of a system to provide a network-based service. The system 100 includes a user-based reverse proxy server (UBRP) 102 that communicates with an enterprise portal 104. The institutional portal 104 is accessible to a user device 106 via a network, such as the Internet 108 or another local area or wide area network. The UBRP 102 also communicates with an application server, such as the application servers 112 and 114, which can be adapted to provide legacy applications associated with a network-based service.

In a particular illustrative embodiment, the UBRP 102 is adapted to receive a request for a network-based service from the enterprise portal 104. The UBRP 102 can receive the request, for example, from the user device 106 via the Internet 108. The UBRP 102 can be adapted to identify an application associated with the network-based service. In one example, the request can include a user id, such as a user login string, a cookie, another identifier of the user, or any combination thereof, and the UBRP 102 can be adapted to identify the application based on the user id. In another embodiment, the UBRP 102 can be adapted to identify the application based on the requested service, the user id, other information, or any combination thereof.

The UBRP 102 can be adapted to retrieve a user file that includes user data elements related to a user that is associated with the request. The user file can include user data elements related to the user that is associated with the request, another user, or any combination thereof. In one example, the user file can include data elements with a header line or can be in XML format. The user file can be stored at the UBRP 102, or at a data store 110 that is accessible to the UBRP 102.

Further, the UBRP 102 can be adapted to retrieve an action file associated with the identified application. The action file indicates types of user data elements required for users to access the application. The action file can be stored at the UBRP 102 or at the data store 110. The UBRP 102 can be adapted to identify, from the action file, a type of user data element that is required for the user associated with the request to access the application.

The UBRP 102 can be adapted to retrieve the required user data element from the user file and to use the required user data element to create a cookie, a URL, another proxy request element, or any combination thereof, to proxy the request to the identified application. For example, a URL required for a particular user to access the identified application can be "http://www.application1/service12/id=^SSN^," which can be stored at the UBRP 102 in the action file corresponding to the identified application. The UBRP 102 can be adapted to retrieve a social security number value from the user file and to place the value in the SSN field of the URL. Any number of data fields can be included in the URL.

In another example, a cookie required for a particular user to access the identified application can be "COOKIE name: app1;domain:att.com;path/value=^APPID^," which can be stored in the action file. The cookie specifies that a cookie named app1 must be set to the requesting user's APPID value from the corresponding user file. The UBRP 102 can be adapted to retrieve the user's APPID and insert it into the cookie before transmitting the created cookie to the identified application.

The UBRP 102 is adapted to proxy the request for the network-based service to the identified application by sending the created proxy request element to an application server associated with the application, such as the application server 112. The UBRP 102 can be adapted to determine whether the user is logged in to the application after proxying the request to the application and to proxy communication between the requesting device and the identified application after the user is logged in. The UBRP 102 can continue proxying communication between the requesting device and the identified application until the user session has ended.

In a particular embodiment, the UBRP 102 can be adapted to receive a request to add a user. The UBRP 102 can add a user data element related to the user to a user file stored at the UBRP 102. Additionally, as a new application is integrated to the system 100, a directory, an action file, or any combination thereof, can be created for the application at the UBRP 102.

In another particular illustrative embodiment, the UBRP 102 can be adapted to receive a request for a network-based service from the enterprise portal 104, where the request includes a URL submitted by the user device 106 to the enterprise portal 104. The UBRP 102 can be adapted to examine a URL included with the request, in order to identify a requested application. For example, the URL https://www.att.com/application1 can be received with a request at the UBRP 102 via the enterprise portal 104. The UBRP 102 can be adapted to identify "application1" as the requested application. Each application can have its own directory.

The UBRP 102 can be adapted to retrieve a user id from a cookie received with the request and to retrieve a user file based on the user id. Further, UBRP 102 can be adapted to open an action file associated with the requested application. The UBRP 102 can be adapted to identify, from the action file, a user data element that is required for the user associated with the request to access the application.

The UBRP 102 can be adapted to retrieve from the user file a user data element that is required for the user associated with the request to access the application. In addition, the UBRP 102 can be adapted to use the required user data element to create another URL including the retrieved user data element. The UBRP 102 can be adapted to redirect the request for the network-based service to the identified application by sending the created URL to an application server associated with the application. The UBRP 102 can be adapted to proxy communication between the requesting device and the application until a session ends.

In a particular embodiment, the UBRP 102 can be adapted to determine an access level for a user associated with the user. For instance, the user may only be allowed to access certain aspects of an application, such as particular information associated with the user, particular functions of the application that are accessible to the user (e.g., an administrator or non-administrator employee of a company), another aspect of the application, or any combination thereof. Other characteristics of a request, such as system views previously granted to the user and specific data elements required by applications can be stored at the UBRP 102. The UBRP 102 can present these characteristics to the application with a proxied request.

In an illustrative, non-limiting embodiment, the UBRP 102 can include hardware, processing logic, such as a processor (not shown), memory (not shown) that includes instructions that are readable and executable by the processing logic, or any combination thereof, to perform one or more functions of the UBRP 102 with respect to providing a network-based service. In one example, the UBRP 102 can include a Java servlet.

Figure 2:
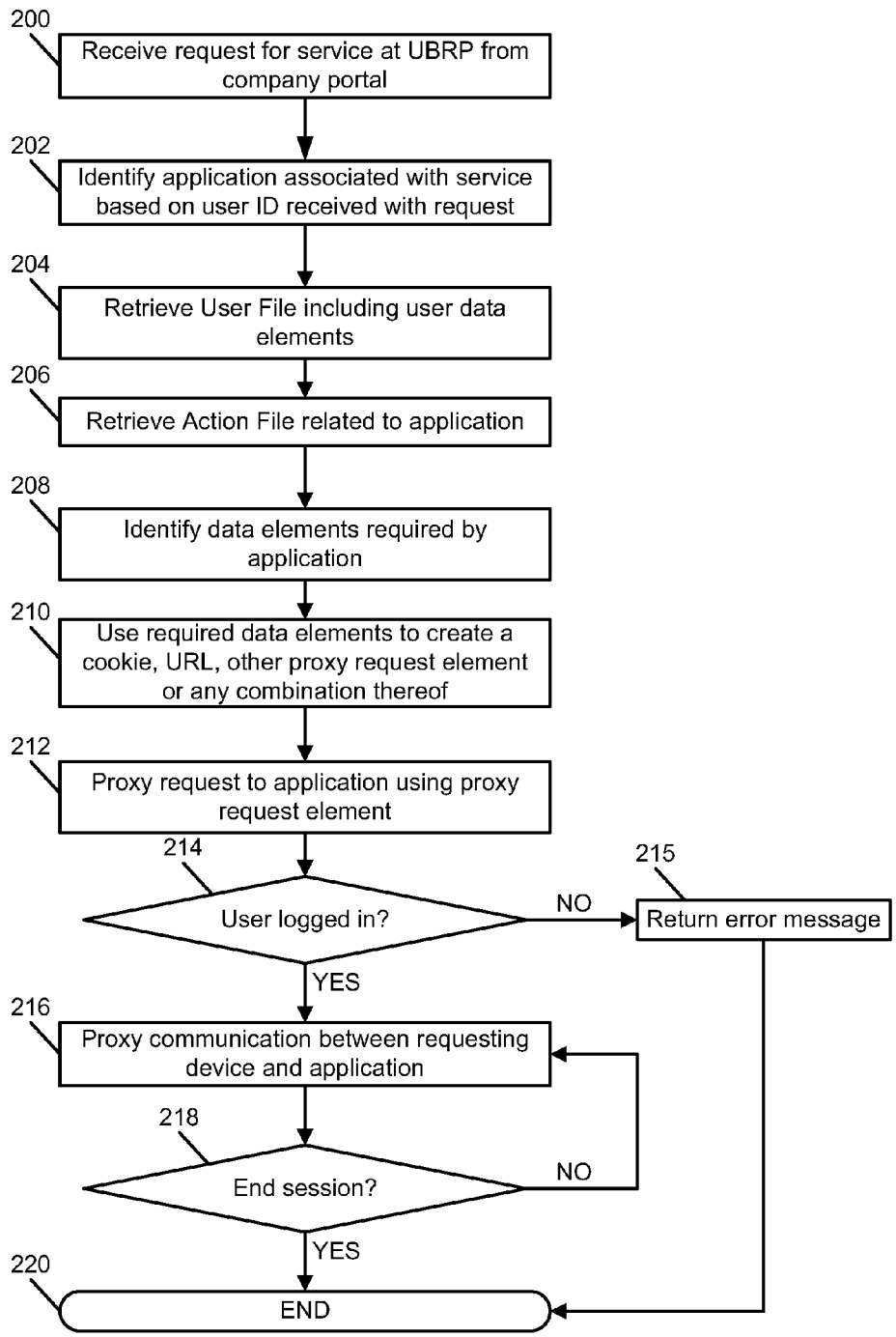
FIG. 2 is a flow diagram illustrating a particular embodiment of a method of providing a network-based service.

FIG. 2 illustrates a particular embodiment of a method of providing a network-based service. At block 200, a UBRP receives a request for a network-based service from an enterprise portal. The request can be received, for example, from a requesting device associated with a user. Moving to block 202, the UBRP identifies an application associated with the network-based service. In one example, the request can include a user id, such as a user login string, a cookie, another identifier of the user, or any combination thereof, and the UBRP can identify the application based on the user id.

Proceeding to block 204, the UBRP retrieves a user file that includes user data elements related to a user that is associated with the request. Continuing to block 206, the UBRP retrieves an action file associated with the identified application. The action file indicates user data elements required for users to access the application. Advancing to block 208, the UBRP identifies from the action file a user data element that is required for the user associated with the request to access the application.

At block 210, the UBRP uses the required user data element to create a cookie, a URL, another proxy request element, or any combination thereof. Moving to block 212, the UBRP proxies the request for the network-based service to the identified application by sending the created proxy request element to an application server associated with the application. Proceeding to decision node 214, the UBRP can determine whether the user is logged in to the application after proxying the request to the application. If the user is not logged in, the method can continue to block 215, and the UBRP can return an error message to the requesting device via the enterprise portal.

Conversely, if the user is logged in, the method can advance to block 216, and the UBRP proxies communication between the requesting device and the identified application. At decision node 218, the UBRP can determine whether a user session has ended. The UBRP can continue proxying communication between the requesting device and the application until the user session has ended. The method terminates at 220.

Figure 3:
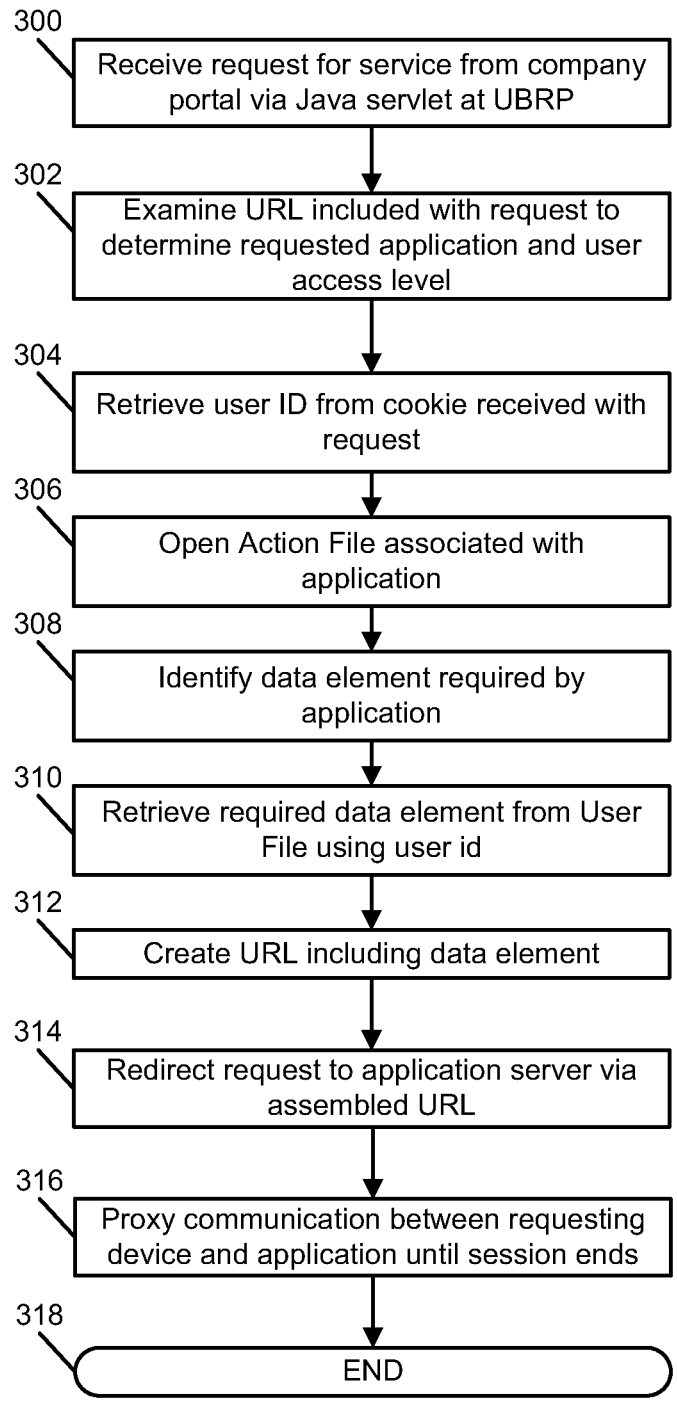
FIG. 3 is a flow diagram illustrating another particular embodiment of a method of providing a network-based service.

FIG. 3 is a flow diagram illustrating another particular embodiment of a method of providing a network-based service. At block 300, a request for a network-based service is received from an enterprise portal via a Java servlet at a UBRP. Moving to block 302, the Java servlet examines a URL included with the request to identify a requested application and an access level corresponding to the user for the application. Proceeding to block 304, the Java servlet retrieves a user id from a cookie received with the request. Continuing to block 306, the Java servlet opens an action file associated with the requested application. Advancing to block 308, the Java servlet identifies from the action file a user data element that is required for the user associated with the request to access the application.

At block 310, Java servlet retrieves from the user file a user data element that is required for the user associated with the request to access the application. At block 312, the Java servlet uses the required user data element to create another URL including the retrieved user data element. Moving to block 314, the Java servlet redirects the request for the network-based service to the identified application by sending the created URL to an application server associated with the application. Proceeding to block 316, the Java servlet proxies communication between the requesting device and the application until a session ends. The method terminates at 318.

Figure 4:
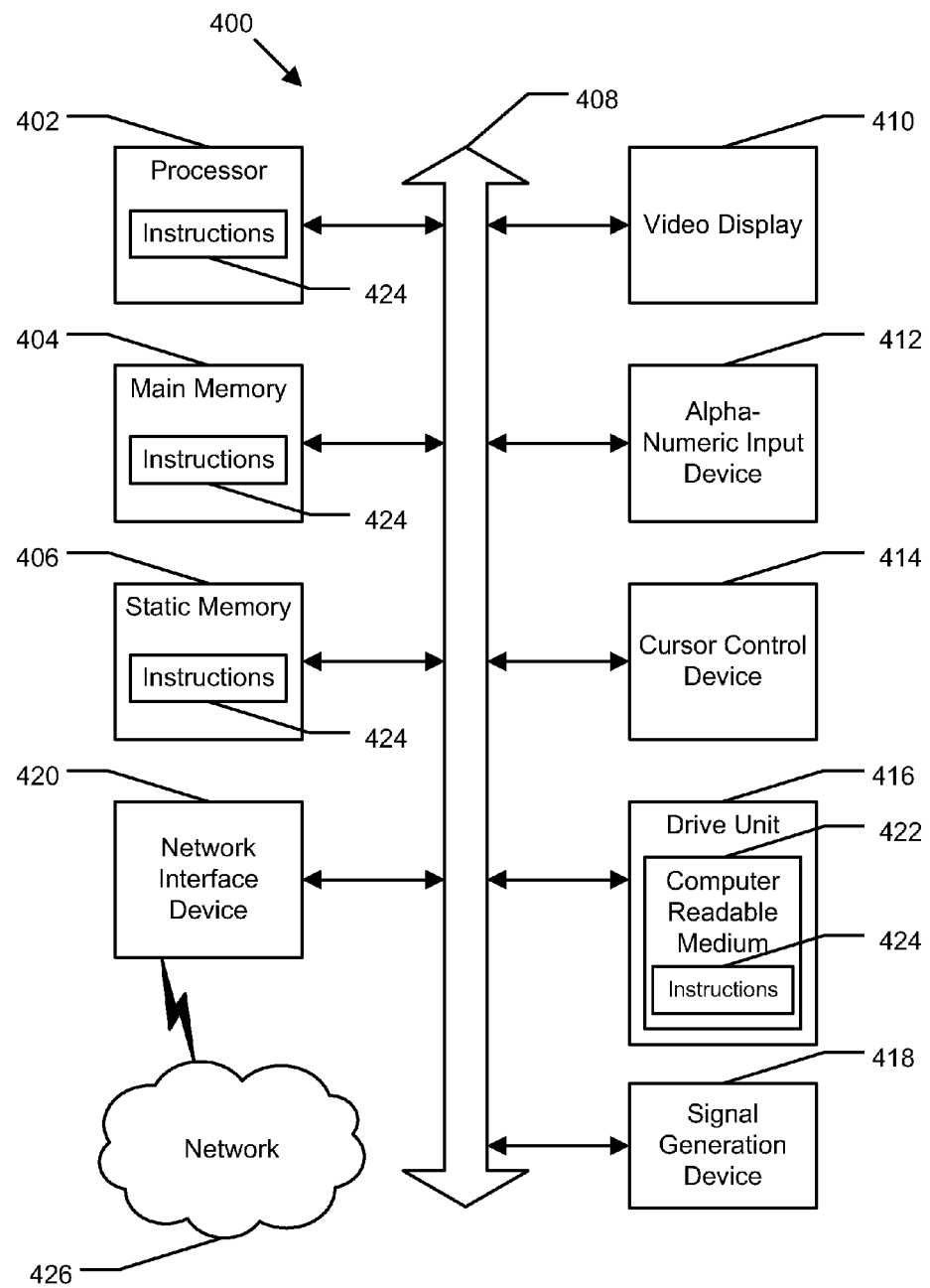
FIG. 4 is a block diagram of a particular embodiment of a general computing system.

FIG. 4 shows an illustrative embodiment of a general computer 400 including a set of instructions that can be executed to cause the computer system to perform any one or more of the methods or computer based functions disclosed herein. The computer system 400 may operate as a standalone device or may be connected, such as using a network, to other computer systems or peripheral devices. In an illustrative embodiment, such standalone and peripheral devices can include, for example, servers, databases, other network elements, or any combination thereof, as illustrated in FIG. 1.

In a networked deployment, the computer system 400 may operate in the capacity of a server or as a client user computer in a server-client user network environment, or as a peer computer system in a peer-to-peer (or distributed) network environment. The computer system 400 can also be implemented as or incorporated into various devices, including, for instance, user devices adapted to send a service request, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

The computer system 400 may include a processor 402, such as a central processing unit (CPU), a graphics processing unit (GPU), or both. Moreover, the computer system 400 can include a main memory 404 and a static memory 406 that can communicate with each other via a bus 408. As shown, the computer system 400 may further include a video display unit 410, such as a liquid crystal display (LCD), an organic light emitting diode (OLED), a flat panel display, a solid state display, or a cathode ray tube (CRT). Additionally, the computer system 400 may include an input device 412, such as a keyboard, and a cursor control device 414, such as a mouse. The computer system 400 can also include a disk drive unit 416, a signal generation device 418, such as a speaker or remote control, and a network interface device 420.

In a particular embodiment as depicted in FIG. 4, the disk drive unit 416 may include a computer-readable medium 422 in which one or more sets of instructions 424, e.g. software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include computer-readable media. The network interface device 420 can provide connectivity to a network 426, such as a wide area network (WAN), a local area network (LAN), or other network.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 424 or receives and executes instructions 424 responsive to a propagated signal, so that a device connected to a network 426 can communicate voice, video or data over the network 426. Further, the instructions 424 may be transmitted or received over the network 426 via the network interface device 420.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (such as TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

In accordance with the embodiments disclosed herein, a system and method to provide a network-based service are provided. Enterprise portals can rely on legacy systems historically used internally within the enterprise. Legacy systems providing the services may be costly to modify, in terms of cost and time, in order to accommodate requests from the enterprise portal. As organizations struggle to bring more services online, a user-based reverse proxy (UBRP) can integrate applications historically considered back-end to the enterprise portal. Classic reverse proxies provide access to services uniformly, such that all users requesting a service access the service in the same manner with the same characteristics. Thus, an enterprise providing a service is often required to vary the service depending on who is making a request.

Seamlessly integrating legacy systems into an enterprise portal with a single sign-in mechanism can improve the user's experience. The enterprise portal typically does not contain data elements required for systems providing services intended for public offering, particularly systems associated with legacy applications historically offered internally. Nonetheless, in order to offer services to a wide population, additional data elements beyond those contained in the original request must often be assembled and presented to the application on behalf of the requesting user. Thus, in order to be effective, a request to an application via an enterprise portal must be combined with other knowledge, such as knowledge of what application is being requested, who is making the request, what system is receiving the request on behalf of the proxy, where the application resides, and what data elements are required to identify the user to the application.

In a particular embodiment, a user-based reverse proxy (UBRP) receives requests for services from an enterprise portal. The UBRP is an expandable, flexible, easily administrable mechanism that permits quickly bringing services online that require user data beyond that which might be housed in the enterprise portal. The UBRP can store knowledge of all supported services, each service's required data elements, a network location for each service (such as a URL for an application server), user data elements for each user, or any combination thereof. Based on a user identifier transmitted with the request for a service, the UBRP can determine the application supporting the service, gather required data element(s) for the application, and can proxy the request from the enterprise portal to the application, using the required data element(s).

In an illustrative embodiment, the UBRP can examine data made with a request in order to determine whether a user has access rights to an application and what access rights the user has. Other characteristics of a request, such as system views previously granted to the user and specific data elements required by applications can be stored at the UBRP. These characteristics can be presented to the application by the UBRP with a proxied request.

Many different aspects and embodiments are possible. Some of those aspects and embodiments are described below. After reading this specification, skilled artisans will appreciate that those aspects and embodiments are only illustrative and do not limit the scope of the present invention.

According to a first aspect, a method of providing a network-based service can include receiving a request for a service at a proxy server, where the request identifies a user. The method can also include identifying an application associated with the service based on the request and identifying a user data element required by the application for the user to access the application. The method can also include creating an application request element the includes the identified data element and proxying the request to the application using the created application request element.

In an embodiment of the first aspect, the proxy server can include a reverse proxy.

In another embodiment of the first aspect, the application request element can include a cookie, a uniform resource locator (URL), or a combination thereof, which includes the user data element. Proxying the request can include transmitting the URL, the cookie, or a combination thereof, to an application server associated with the application.

In a further embodiment of the first aspect, the method can include retrieving the user data element from a user file stored at the proxy server. The user data element can be accessible via a header of the user file, via extensible markup language (XML) data within the user file, or a combination thereof.

In another embodiment of the first aspect, identifying the required user data element can include accessing an action file associated with the application. The action file is stored at the proxy server and wherein the action file indicates that the user data element is required for the user to access the application.

In still another embodiment of the first aspect, the method can include determining an access level associated with the user before creating the application request element. The access level can indicate a portion of the application that is accessible to the user.

In yet another embodiment of the first aspect, the method can include determining whether the application has granted access to the user after proxying the request to the application and proxying communication between a requesting device associated with the user and the application after the application has granted access to the user.

In a further embodiment of the first aspect, the application can be identified based on a user id received with the request. For example, the user id is included in a cookie received with the request.

According to a second aspect, a system to provide a network-based service can include a user-based reverse proxy (UBRP) device adapted to receive a request for a service at a proxy server, where the request identifies a user. The user-based reverse proxy (UBRP) device can also be adapted to identify an application associated with the service based on the request. The user-based reverse proxy (UBRP) device can also be adapted to identify a user data element required by the application for the user to access the application. The user-based reverse proxy (UBRP) device can also be adapted to create an application request element using the identified data element and proxy the request to the application using the created application request element.

In an embodiment of the second aspect, the request for the service can be received at the UBRP device from an enterprise portal. The UBRP can be accessible to the user over the Internet via the enterprise portal.

In another embodiment of the second aspect, the UBRP can be adapted to proxy communication between a requesting device associated with the user and the application after the application has granted access to the user.

According to a third aspect, a computer-readable medium can include processor-readable instructions that are executable by a processor to perform a method. The method can include receiving a request for a service at a proxy server, where the request identifies a user. The method can also include identifying an application associated with the service based on the request and identifying a user data element required by the application for the user to access the application. The method can also include creating an application request element using the identified data element and proxying the request to the application using the created application request element.

In an embodiment of the third aspect, the method includes proxying communication between a requesting device associated with the user and the application after the application has granted access to the user.

In another embodiment of the third aspect, the processor-readable instructions comprise a Java servlet.

In another embodiment of the third aspect, the method can include receiving data indicating a new application accessible to the UBRP. The method can also include creating a directory related to the new application, creating an action file including a data element required to access the new application, or any combination thereof.

In another embodiment of the third aspect, the method can include receiving data indicating a new user data element related to the new application and adding the new user element to a user file that includes the user data element.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGS. are to be regarded as illustrative rather than restrictive.

The foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method of providing a network-based service, the method comprising:
receiving a request for a service at a proxy server, wherein the request includes a user login string to identify a user, wherein the request includes a first uniform resource locator;
identifying an application associated with the service based on the request and the first uniform resource locator, wherein the application is identified from a portion of an address of the first uniform resource locator;
retrieving an action file stored at the proxy server, the action file identifying a type of user data element required by the application for the user to access the application;
retrieving the user data element stored at the proxy server;
creating, by utilizing the identified user data element, an application request element and a second uniform resource locator utilized for proxying the request for the service, wherein the application request element includes the identified user data element and the second uniform resource locator, wherein the identified user data element is inserted into the second uniform resource locator, wherein the second uniform resource locator is different from the first uniform resource locator;
proxying the request to the application using the created application request element and the second uniform resource locator, wherein the request that is proxied includes system views granted to the user, an identification of a location that the application resides, and an identification of information required to identify the user to the application;
determining whether the user is logged into the application after proxying the request to the application;
returning an error message to a requesting device associated with the user when the user is determined to not be logged into the application; and
proxying a communication between the requesting device and the application when the user is determined to be logged into the application.

2. The method of claim 1, wherein the proxy server comprises a reverse proxy.

3. The method of claim 1, wherein the application request element further comprises a cookie which includes the user data element.

4. The method of claim 3, wherein proxying the request comprises one of transmitting the second uniform resource locator and the cookie to an application server associated with the application.

5. The method of claim 1, further comprising retrieving the user data element from a user file stored at the proxy server.

6. The method of claim 5, wherein the user data element is accessible via one of a header of the user file and extensible markup language data within the user file.

7. The method of claim 1, wherein identifying the required user data element comprises accessing an action file associated with the application, wherein the action file is stored at the proxy server and wherein the action file indicates that the user data element is required for the user to access the application.

8. The method of claim 1, further comprising determining an access level associated with the user before creating the application request element, wherein the access level indicates a portion of the application that is accessible to the user.

9. The method of claim 1, further comprising:
determining whether the application has granted access to the user after proxying the request to the application; and
proxying the communication between the requesting device associated with the user and the application after the application has granted access to the user.

10. The method of claim 1, wherein the application is identified based on a user id received with the request.

11. The method of claim 10, wherein the user id is included in a cookie received with the request.

12. A system to provide a network-based service, the system comprising:
a network interface; and
a user-based reverse proxy device coupled to the network interface, the proxy device performing operations, the operations comprising:
receiving a request for a service at a proxy server, wherein the request includes identity information to identify a user, wherein the request includes a first uniform resource locator;
identifying an application associated with the service based on the request and the first uniform resource locator, wherein the application is identified from a portion of an address of the first uniform resource locator;
retrieving an action file stored at the proxy server, the action file identifying a type of user data element required by the application for the user to access the application;
retrieving the user data element stored at the proxy server;
creating, by utilizing the identified user data element, an application request element and a second uniform resource locator utilized for proxying the request for the service, wherein the application request element includes the identified user data element and the second uniform resource locator, wherein the identified user data element is inserted into the second uniform resource locator, wherein the second uniform resource locator is different from the first uniform resource locator;
proxying the request to the application using the created application request element and the second uniform resource locator, wherein the request that is proxied includes system views granted to the user, an identification of a location that the application resides, and an identification of information required to identify the user to the application;
determining whether the user is logged into the application after proxying the request to the application;
returning an error message to a requesting device associated with the user when the user is determined to not be logged into the application; and
proxying a communication between the requesting device and the application when the user is determined to be logged into the application.

13. The system of claim 12, wherein the request for the service is received at the user-based reverse proxy device from an enterprise portal.

14. The system of claim 12, wherein the user-based reverse proxy is accessible to the user over the internet via the enterprise portal.

15. The system of claim 12, wherein the operations further comprise proxying the communication between the requesting device associated with the user and the application after the application has granted access to the user.

16. A non-transitory computer-readable medium including processor-readable instructions that are executable by a processor to perform operations, the operations comprising:

receiving a request for a service at a proxy server, wherein the request includes identity information to identify a user, wherein the request includes a first uniform resource locator;
identifying an application associated with the service based on the identity information and the first uniform resource locator, wherein the application is identified from a portion of an address of the first uniform resource locator;
retrieving an action file stored at the proxy server, the action file identifying a type of user data element required by the application for the user to access the application;
retrieving the user data element stored at the proxy server;
creating, by utilizing the identified user data element, an application request element and a second uniform resource locator utilized for proxying the request for the service, wherein the application request element includes the identified user data element and the second uniform resource locator utilized, wherein the identified user data element is inserted into the second uniform resource locator, wherein the second uniform resource locator is different from the first uniform resource locator;
proxying the request to the application using the created application request element and the second uniform resource locator, wherein the request that is proxied includes system views granted to the user, an identification of a location that the application resides, and an identification of information required to identify the user to the application;
determining whether the user is logged into the application after proxying the request to the application;
returning an error message to a requesting device associated with the user when the user is determined to not be logged into the application; and
proxying a communication between the requesting device and the application when the user is determined to be logged into the application.

17. The computer-readable medium of claim 16, wherein the operations further comprise proxying the communication between the requesting device associated with the user and the application after the application has granted access to the user.

18. The computer-readable medium of claim 16, wherein the processor-readable instructions comprise a servlet.

19. The computer-readable medium of claim 16, wherein the operations further comprise receiving data indicating a new application accessible to the user-based reverse proxy, creating a directory related to the new application, and creating an action file including a data element required to access the new application.

20. The computer-readable medium of claim 16, wherein the operations further comprise receiving data indicating a new user data element related to the new application and adding the new user element to a user file that includes the user data element.

* * * * *